United States Patent [19]

Haines

[11] Patent Number: 4,874,570
[45] Date of Patent: Oct. 17, 1989

[54] METHOD OF MAKING A GAMES RACKET

[75] Inventor: Robert C. Haines, Huddersfield, England

[73] Assignee: Dunlop Limited, United Kingdom

[21] Appl. No.: 56,944

[22] Filed: Jun. 3, 1987

[30] Foreign Application Priority Data

Jan. 16, 1985 [GB] United Kingdom ............... 85-01006

[51] Int. Cl.[4] ...................... B29C 33/12; B29C 45/36
[52] U.S. Cl. .................................. 264/154; 264/156; 264/257; 264/317; 264/278; 264/279; 273/73 C
[58] Field of Search ............... 264/250, 257, 258, 267, 264/317, 275, 278, 279, DIG. 44, 154, 156; 273/73 C

[56] References Cited

U.S. PATENT DOCUMENTS

| | | | |
|---|---|---|---|
| 3,840,626 | 10/1974 | Laskawy | 264/317 |
| 3,882,220 | 5/1975 | Ryder | 264/221 |
| 4,000,877 | 1/1977 | Shead et al. | 249/82 |
| 4,195,046 | 3/1980 | Kesling | 264/317 |
| 4,291,574 | 9/1981 | Frolow | 273/73 H |
| 4,297,308 | 10/1981 | Popplewell | 264/317 |
| 4,460,423 | 7/1984 | Bosnia | 264/46.5 |
| 4,470,786 | 9/1984 | Sano | 425/116 |
| 4,614,627 | 9/1986 | Curtis et al. | 264/221 |

*Primary Examiner*—Jay H. Woo
*Assistant Examiner*—Jeremiah F. Durkin, II
*Attorney, Agent, or Firm*—Stevens, Davis, Miller & Mosher

[57] ABSTRACT

The invention relates to hollow frames for games rackets e.g. for squash and badminton, which are in the form of hollow injection moldings of thermoplastics material and to a method of making such frames involving injecting the thermoplastics material around a fusible core that can be subsequently melted out. For rackets such as for squash and badminton with relatively long thin shafts undesirable displacement of the shaft portion (22) of the core under molding pressure is achieved by use of locating means (24A, 25A) that form holes that do not weaken the eventual shaft (23). The means are positioned to correspond to the neutral surface of the shaft and such that the greatest unclamped length of shaft core between supports divided by the depth of the shaft core is less than 10.

10 Claims, 2 Drawing Sheets

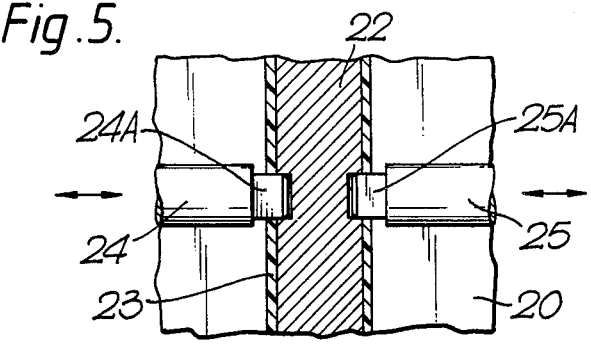
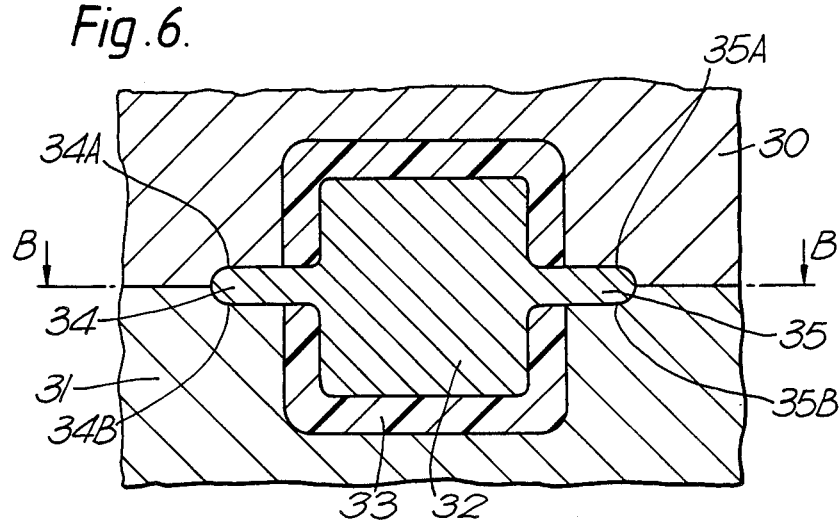
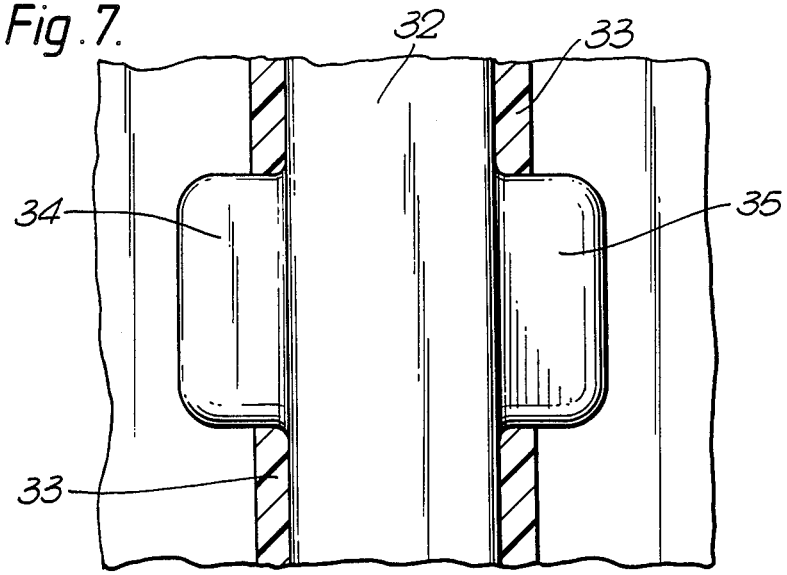

METHOD OF MAKING A GAMES RACKET

This is a division of application Ser. No. 815,894, filed Jan. 3, 1986, now abandoned.

This invention relates to racket frames made by injection-molding of reinforced thermoplastics material and is particularly concerned with, although not limited to, racket frames suitable for the game of Squash Rackets.

Squash racket frames have traditionally been made of wood and the manufacture of a good quality wooden frame is a very complicated, laborious and expensive procedure involving the use of many layers of different wood veneers, glues, shaping and cutting, fitting of throat pieces and handles, drilling of holes for strings and a variety of finishing operations.

Hollow reinforced plastics frames have been proposed for squash rackets and have met with some commercial success but they tend to be rather expensive because of the laborious method of manufacture necessarily used. Basically this involves the building of a suitable hollow frame around an inflatable mandrel by winding around the mandrel continuous reinforcing filaments wetted in a thermo-setting resin. After the resin has set and the mandrel has been removed it is still necessary to drill the holes for stringing.

The present invention aims to provide a high quality reinforced plastics material frame for a squash racket by an injection molding technique.

In our U.K. Patent No. 2,015,886 we have described and claimed a games racket frame in which the frame comprises a head and a shaft, at least the head being a hollow injection molding of thermoplastics material reinforced with short filament reinforcing material, in which the wall of the molding which lies at the outer circumference of the head is joined to the wall which lies at the inner circumference of the head by an internal support means and the stringing holes in the head pass through the support means, the walls and support means of the molding being integrally-formed. By "thermoplastics material reinforced with short filament reinforcing material" is meant a reinforced thermoplastics material in which the reinforcements are in the form of short discrete lengths of fiber-reinforcing material randomly dispersed in the thermoplastics resin matrix.

Games racket frames made according to our U.K. Patent No. 2,015,886 (and its equivalent U.S. Pat. No. 4,297,308) have had considerable commercial success for the game of tennis. However, difficulties have been encountered when attempting to adapt the method of manufacturing the hollow injection-molded frames to the manufacture of a squash racket frame.

The method of manufacture of hollow injection-molded, reinforced thermoplastics racket frames as disclosed in our U.K. Patent No. 2,015,886 is as follows. The frame, comprising a head and a shaft, is made by molding at least the head by injecting a thermoplastics material around a fusible core, the core having a melting point below the injection temperature and being shaped to provide internal support means between that wall of the molding that is to lie at the outer circumference of the head and that wall of the moulding that is to lie at the inner circumference of the head, allowing the molding to set and then raising the temperature to an amount sufficient to melt the core but insufficient to melt or deform the molding.

In practice it is convenient to mold the head and shaft as an integral one-piece construction. This has the advantages of both eliminating extra steps of separate formation and subsequent joining and also eliminating any area of weakness that would inevitably be associated with the joint between the separately-formed parts.

For uniform wall thickness, it is necessary that the core is accurately located in the injection mold during the injection process. Locations means do not normally cause problems of strength in the head and handle regions of the molded frame but special considerations are necessary for the shaft region.

Thus, the basic problem we have found in utilizing this general method to make a one-piece, i.e. integral head and shaft frame for a squash racket lies in the difference in shape between a squash racket frame and a tennis racket frame. In comparison with a tennis racket, a squash racket frame has a long and thin shaft. This relatively long thin shaft of a squash racket presents problems in the injection-molding process simply because the required long thin fusible core is liable to distort under the considerable pressures imposed on it by incoming injected thermoplastics material. It will also be appreciated that this problem exists in the manufacture of other types of rackets, particularly for example badminton rackets, that also have relatively long and narror shafts.

Thus it will be appreciated that as shafts for rackets get longer and thinner, they will deflect more readily. In our above-described injection molding process, the casting (core) around which the shaft is to be formed can deflect under the high pressures of material flow. Thus a product with varying wall-thickness may be produced, leading to strength problems. The longer and narrower the shaft the greater is the problem.

This can be demonstrated using the following standard formula for deflection under load of a beam supported at its ends and loaded at its centre:

$$\text{deflection } S = \frac{W}{48E} \cdot \frac{12}{b} \left(\frac{L}{d}\right)^3$$

where  $L$ = the length between supports
 $b$ = width and $d$ = depth of beam (core casting)
 $W$ = weight or load applied at mid-point
 $E$ = Young's Modulus of material (casting material).

When locating a racket frame core in the injection mold, there is usually no problem, i.e. it does not cause problems of strength, in providing locating means, i.e. anti-displacement means, usually a pin or pins, in the area where the shaft joins the head. Also there is no difficulty in providing such locating means at the handle end of the shaft. Locating pins there will form holes in the product that can be covered and so reinforced by the handle which can be separately, molded-on and on the other hand are sufficiently distant from positions where the shaft is highly stressed to cause no effective weakening of the product. However, this may leave a considerable central length of shaft 'L' between the head and the handle region that may require anti-displacement means. As will be seen from the formula above, deflection S is very sensitive to L/d because this quotient is cubed. Width b has only a relatively minor effect—but see next paragraph but one.

For example, for a tennis racket a typical L/d value is of the order of 8 whereas for a squash racket it is of the order of 15. Hence with all other factors constant, deflection S will be of the order of $8^3$ for tennis and $15^3$ for squash, i.e. 512 and 3375. Therefore the squash racket shaft deflection will have increased over six fold compared to that for the tennis racket whereas the L/d ratio has not doubled.

When the width 'b' ratio is additionally taken into account the situation can be seen to be even worse for the squash racket. Width of the squash shaft is normally about $\frac{1}{2} \times$ width of a tennis shaft and so the ratio of deflection will increase to over 12 fold rather than 6 fold.

Means to overcome movement of cores in injection molds are of course not new. In our own European Patent No. 0025127 we have described a technique involving the use of locating lugs formed on the fusible core. Also it has been previously proposed to use locating means in the mold in the form of pins that pass through the core and such locating pins are described, for example, in our U.K. Patent No. 2,015,886.

However, any such locating means produces holes in the wall of the molding and in the case of the shaft for a games racket this can be a serious source of weakness because the shaft of a squash or badminton racket in particular is highly stressed in play.

We have now found that it is possible to position such location means such that the holes produced in the shaft have minimal effect of the strength of the shaft. This is possible if the location means produces holes which are centered on the neutral surface of flexure of the shaft in its primary mode of flexure in play—this is for flexure that occurs in a plane through the shaft which is perpendicular to the plane of the strings. For instance, this is the mode of flexure which is generated in the shaft when the racket contacts a ball.

The neutral surface of the shaft is the notional surface in which there are no tensile or compressive stresses in the shaft when subject to the mode of flexure described above.

To further reduce the possibilitiy of the shaft fracturing at a hole produced by the location means, the location means shouldbe positioned at points remote from positions where the shaft becomes particularly highly stressed, i.e. away from any significant change of section near, for instance, the handle or near the head of the frame.

Preferably the location means is at a central longitudinal position midway between conventional location points at the head and handle ends of the shaft. This will produce one hole or slot on each side of the hollow shaft. Alternatively. if additional location means are considered to be necessary, these are preferably positioned so that the distances between them are equal and equal to the distance between the end location means ard the conventional location means at the handle or head end of the racket, accepting at all times that no location means should be adjacent to a change in section as noted previously.

Accordingly the invention in one aspect provides a method of molding a games racket frame comprising a hollow head and shaft, in which the head and shaft are integrally-molded by injecting thermoplastics material around a fusible core having the desired internal shape of the head and shaft, the core having a melting point below the injection temperature and the shaft portion of the core being supported in the injection mold adjacent its head end and in the region of the eventual handle with, additionally at least one pair of locating means between the head end and handle region of the shaft, one of each pair lying on opposite sides of the shaft portion of the core, the means being positioned to correspond to the neutral surface, as herein defined, of the eventual shaft and being positioned longitudinally of the shaft so that the greatest unclamped length of the shaft portion of the core between supports, divided by the depth of the shaft portion of the core is less than 10, allowing the molding to set and then raising the temperature to an amount sufficient to melt the core but insufficient to melt or deform the molding.

The locating means may suitably be mold location pins or they may be, for example, locating lugs integrally-formed as part of the fusible core.

In another aspect the invention provides a games racket frame comprising a head and shaft in the form of an integral hollow injection molding of thermoplastics material, the shaft having at least one pair of holes, one of each pair lying on opposite sides of the shaft, the holes being located on the neutral surface of the shaft, as herein defined, the holes corresponding to mould locating means used during the injection molding step and positioned longitudinally between the handle region and the head end of the shaft so that the distance from either hole of the nearest pair to the head end of the shaft divided by the internal depth of the shaft is less than 10.

Preferably the ratio of unsupported distance to internal depth is less than 8.

It will be appreciated that in the finished product there will usually be at least one hole in the handle region corresponding to, say, a mold locating pin used there. The ratio X/d where 'X' is the distance from that hole to a hole in the central region of the shaft should also be less than 10.

It will usually be desirable to use the minimum number of locating means in the central region of the shaft, i.e. between its handle region and head end, that will give the desired effect. Clearly a greater number of, say, pins will reduce the ratio further but there is little advantage once the displacement effect has been overcome in increasing the number of pins. At the extreme, of course, too many holes, even along the neutral surface will eventually weaken the product undesirably.

For a typical squash racket we have found that one slot on each side of the shaft in its central region is satisfactory, whereas for a badminton racket two or three slots on each side may be necessary.

The pairs of, say, pins (and eventual slots) need not be positioned exactly opposite each other on either side of the shaft but this may be found convenient in practice.

The racket frame may be made having the type of internal reinforcement described in U.S. Pat. No. 2,015,886, i.e. in which the wall of the frame which lies at the outer circumference of the head is joined to the wall which lies at the inner circumference of the head by an internal support means and the stringing holes pass through those support means. In other words the internal support means, which are integrally-molded with the frame, can be arranged to automatically provide the stringing holes, thereby obviating the need to drill the holes separately. Preferably these internal support means are a row of centrally-disposed hollow pillars extending around the head portion of the frame.

Suitable thermoplastics materials from which the frame may be molded include polyamides, polycarbonate, acrylonitrile-butadiene-styrene (ABS), acetal resins and poly-(phenylene oxide) (PPO). (So-called 'modified' grades of PPO are now commercially available that are especially designed for injection-molding applications).

The plastics material used is preferably reinforced with glass fibres or carbon fibers. Carbon fibres are the preferred reinforcing means and injection mixtures containing from 10% to 40% by weight of carbon fiber are especially preferred. Mixtures of glass and carbon fibers may also be used. Furthermore, mixtures of carbon fibers of different lengths may advantageously be used as the reinforcing means, as described in our copending European Patent Application No. 85304469.1. In this application is described the use of a thermoplastics molding composition which contains, prior to molding, at least 40% (by weight of total reinforcing fibers) of reinforcing fibers of length less than 3 mm and up to 60% (by weight of total reinforcing fibers) of reinforcing fibers of length greater than 5 mm. It is preferred that some of these reinforcing fibers prior to moulding have a length of at least 10 mm but not greater than 15 mm.

The core used in the method of the invention is preferably of fusible metal although other low-melting point materials could be used. Suitable metals include, for example Wood's Metal (which is an alloy of lead, tin, bismuth and cadmium) and other commercially available types.

The core may be made, for example, by gravity-casting or diecasting, the latter being preferred. It could, alternatively, be made by extrusion and bending to the appropriate shape. It will be appreciated that in the case of extrusion it will be necessary to drill any holes that are required through the core whereas this will not be necessary by casting where the holes can be formed during the casting process.

Where integrally-molded, internal support means are formed in the product, it is preferred, as indicated above, that they be in the form of a centrally-disposed row of hollow pillars, each pillar extending from the wall at the outer circumference to the wall at the inner circumference of the head. This is achieved during the injection-molding stage by positioning pins in the injection mold to pass through holes formed in the core, the pins being of smaller diameter than the holes whereby the plastics material can flow around the pins to form the walls of the pillars. Thus the pillars are integrally molded.

In another embodiment, the core may be shaped to provide an integrally-molded support means in the product in the form of a series of projections extending inwardly from the sidewalls of the frame.

The invention is further described with reference to the accompanying drawings in which:

FIG. 5 is a part-section along line A—A of FIG. 4:

FIG. 6 is a transverse section through an injection mould used in an alternative embodiment of the method of the invention, and FIG. 7 is a part-section along line B—B of FIG. 6.

Figure 1:
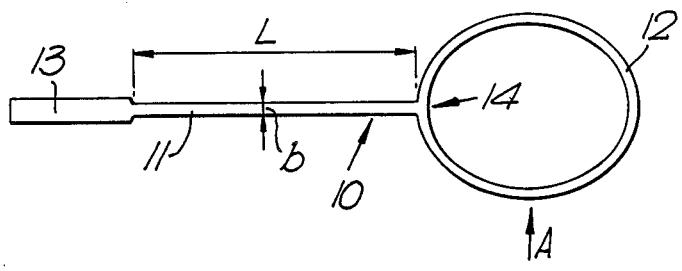
FIG. 1 is a diagrammatic representation of a squash racket.

In FIG. 1 racket frame 10 has a shaft 11 integral with a head 12. A handle 13 is affixed at the end of the shaft remote from the head. It will be apparent that to form such a racket frame by injection molding around a core, the core will have the same basic shape. It can be held firmly in position in the injection mould by clamping means, e.g. locating pins in the central region 14 where the shaft joins the head. Such pins could for example form stringing hole locations in the finished product. Equally a locating pin or pins can be used in the region of the shaft to be covered by handle 13. However, this leaves shaft length 'L' unsupported.

Figure 2:
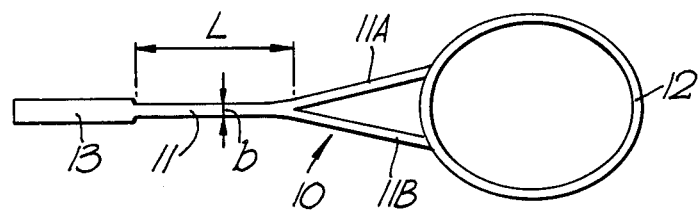
FIG. 2 is a diagrammatic representation of an alternative form of squash racket.

Similarly in FIG. 2 racket frame 10 has an integral shaft 11 and head 12 with handle 13 on the end of the shaft remote from the head. In this embodiment the shaft at the head end forks into branches 11A and 11B. Again it will be apparent that while clamping means, e.g. support by locating pins, adjacent the eventual handle and adjacent the head and the fork of the shaft can be readily provided, length 'L' of shaft is still unsupported.

Width 'b' of the shaft is shown in both FIGS. 1 and 2. (Core width 'b' is of course different from this value by the difference of twice the wall thickness).

Figure 3:
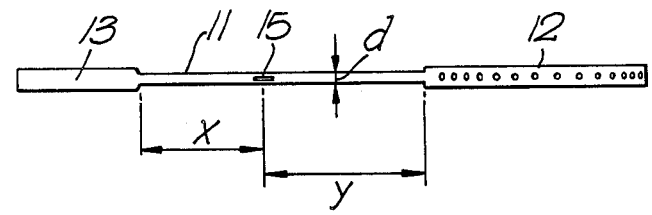
FIG. 3 is a view in a direction equivalent to arrow 'A' of FIG. 1, but of a racket according to the invention.

FIG. 3 shows a racket frame which has been formed using one locating means, e.g. pin, in the mould on each side of the core and centrally disposed with respect to the length of the shaft. Each such pin has resulted in a slot 15 appearing in the molded shaft. The unsupported lengths of shaft during the molding operation were 'X', from the pin to the commencement of the handle and 'y', from the pin to the head. As indicated above 'X' may be equal to 'y' so that the unsupported length 'L' of FIG. 1 has been halved.

Slot 15 lies on the neutral surface of shaft 11.

Depth 'd' of the shaft is indicated in FIG. 3. (Core depth or internal depth of the shaft 'd' is of course different from this value by the difference of twice the wall thickness).

Figure 4:
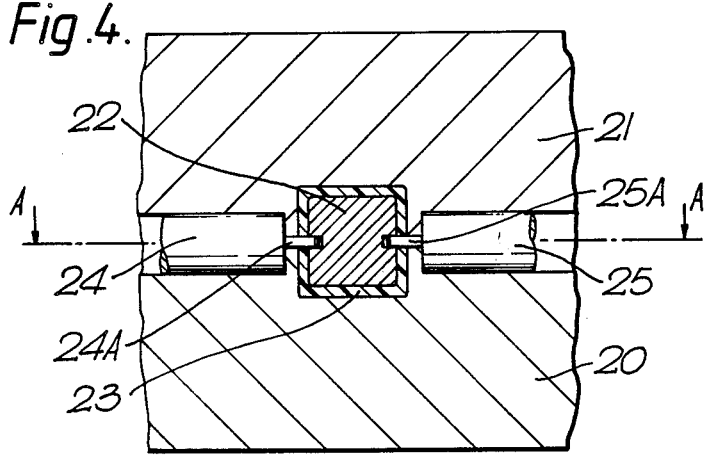
FIG. 4 is a transverse section through an injection mould used in one embodiment of the method of the invention.

FIG. 4 shows a transverse section in the shaft region through the mold containing the moulded frame and FIG. 5 shows the same arrangement but viewed along line A—A of FIG. 4.

Mold halves 20 and 21 together with core 22 define the shaft 23 of the frame. Opposed pair of retractable mold pins 24 and 25 have extensions 24A and 25A respectively that locate in recesses in the core 22. When retracted each of these extensions will leave a slot in the wall of the frame corresponding to slot 15 of FIG. 3. It will be noted that the pin extensions lie on the mold parting line A—A, which is also designed to correspond to the neutral surface of the eventual shaft of the frame.

FIGS. 6 and 7 are similar views to FIGS. 4 and 5 respectively but showing an alternative embodiment in which the locating means are lugs integrally-formed with the core.

Mold halves 30 and 31 together with core 32 define the shaft 33 of the frame. An opposed pair of lugs 34 and 35 is integrally-formed with core 32 and the lugs locate in corresponding recesses defined by portions 34A, 34B and 35A, 35B of mold halves 30 and 31. Thus the lugs lie centrally on the mold parting line B—B, which again corresponds to the neutral surface of the eventual shaft of the frame. When the fusible core including the lugs is melted out, each lug 34 and 35 will leave a slot in the wall of the frame.

As an illustrative and comparative example for each of a tennis racket, a squash racket and a badminton racket, the following dimensions could be used.

Tennis Racket
Core casting 'b'=25 mm 'd'=17 mm.
Distance 'L' between head and handle end supports=140 mm.
Ratio of unsupported distance L/d=8.2.
Squash Racket
Without central shaft support:
Core casting 'b'=14 mm, 'd'=13 mm.

---
Distance between supports = 230 mm
L/d = 17.7
---

With designed-in central shaft support: 'b'=14 mm 'd'=13 mm.
Distance 'X' between supports=115.
Ratio unsupported distance/d=8.85.
Badminton Racket
Without central shaft support:
Core casting 'b'=9 mm, 'd'=9 mm.

---
Distance between supports = 260 mm
L/d = 28.88
---

With one central shaft support X=130 mm, x/d=14.44.
With two equi-spaced central shaft supports x=86.67 mm, x/d=9.63.
With three equi-spaced central shaft supports x=65 mm, x/d=7.22.

Hence for this badminton racket, the shaft should have two and preferably three slots on each side, lying along the neutral axis.

It will be noted that in the above calculations no note has been taken of the actual dimensions of the locating pins, and hence, the slots they form in the shaft. The actual unsupported lengths 'X' involved will of course vary if larger or smaller locating pins are used. However, the above measurements have been taken to the center of pins; the basic trend shown by the calculations will be the same although the values obtained will differ slightly if measurements to the edges of pins are taken.

Again as an example, suitable pin dimensions for central shaft support in the manufacture of a squash racket would be a general rectangular pin (preferably with radiussed corners) of length 8 to 10 mm and depth (width) 1½ to 2 mm. This depth would lie astride the neutral surface of the eventual shaft. Pins of different shape could of course be used but the greater the depth of pin, the greater will be the weakening effect on the product as the edges of the pin move further from the neutral surface.

For a badminton racket, utilizing 3 central shaft pair of pins, typical dimensions are: length 3 to 5 mm and depth 1 mm to 1½ mm.

It will also be appreciated that a racket frame having a shaft of varying 'd' may be required. The general principles outlined above can still be applied to such situations and although the theoretical calculations may become more complex, it will be open to the skilled man of the art to determine in practice the needs for his desired results. Thus, for example, for a shaft with a uniformly tapering bore 'd' will be the mean value of 'd' over the length of the shaft between the supports.

I claim:

1. A method of molding a games racket frame of fiber reinforced plastic material comprising a hollow head and shaft, in which the head and shaft are integrally-molded, said method comprising
   injecting thermoplastics material into an injection mold and around a fusible core, the core having the desired internal shape of the head and shaft and having a melting point below the injection temperature,
   supporting the shaft portion of the core in the injection mold adjacent its head end and in the region of the eventual handle,
   positioning at least one pair of locating means in the shaft portion between the head end and handle region of the shaft, one of each pair of said locating means lying on opposite sides of the shaft portion of the core, the locating means being positioned to correspond to the neutral surface of the eventual shaft and projecting through the thermoplastics material, said neutral surface being the notional surface of the shaft in which there are no tensile or compressive stresses in the shaft when the shaft is subject to flexure by the racket contacting a ball,
   positioning said at least one pair of locating means longitudinally of the shaft so that the greatest unclamped length of the shaft portion of the core between supports, divided by the depth of the shaft portion of the core, is less than 10,
   allowing the molding to set, then raising the temperature to an amount sufficient to melt the core but insufficient to melt or deform the molding and
   removing the molten core and the locating means so as to leave a pair of holes corresponding to each said pair of locating means.

2. A method according to claim 1, in which the greatest unclamped length of the shaft portion between supports divided by the depth of the shaft portion is less than 8.

3. A method according to claim 1, in which a maximum of three pairs of locating means are used between the head end and handle region of the shaft.

4. A method according to claim 1, in which each pair of means is directly opposed across the shaft.

5. A method according to claim 1, in which the means are of generally rectangular configuration of length 8 to 10 mm and depth 1.5 to 2 mm.

6. A method acording to claim 1, in which the means are of generally rectangular configuration of length 3 to 5 mm and depth 1 to 1.5 mm.

7. A method according to claim 1, in which the locating means are locating pins.

8. A method according to claim 1, in which the locating means are fusible lugs integrally-formed on the core.

9. A method according to claim 2, in which a maximum of three pair of locating means are used between the head end and the handle region of the shaft.

10. A method according to claim 2, in which each pair of means is directly opposed across the shaft.

* * * * *